Patented Feb. 4, 1930

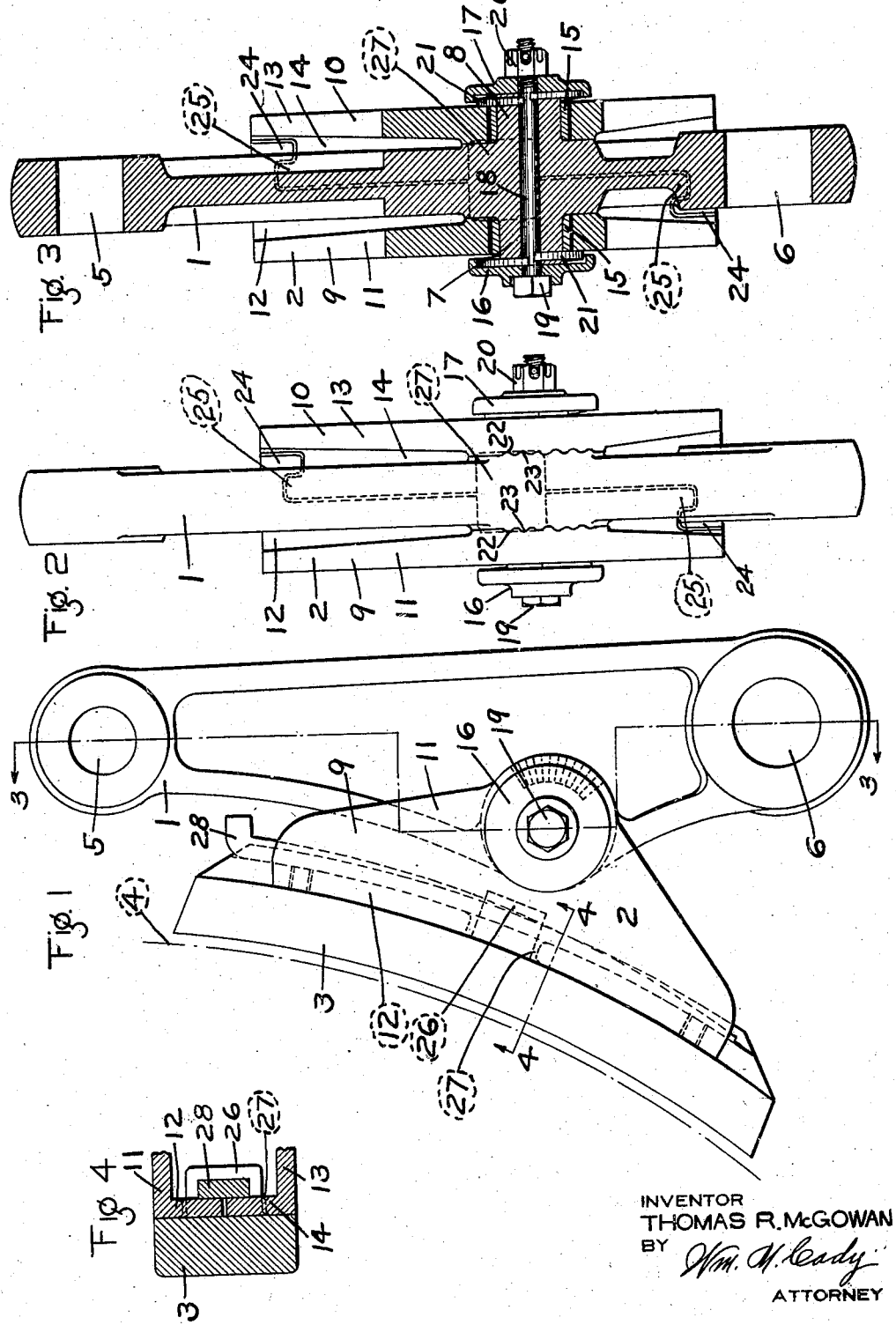

1,746,045

UNITED STATES PATENT OFFICE

THOMAS R. McGOWAN, OF ST. LOUIS, MISSOURI, ASSIGNOR TO THE AMERICAN BRAKE COMPANY, OF ST. LOUIS, MISSOURI, A CORPORATION OF MISSOURI

BRAKE-HEAD CONNECTION

Application filed November 28, 1928. Serial No. 322,381.

This invention relates to vehicle brakes and more particularly to railway locomotive and car brakes and has for its principal object to provide novel means for preventing undesirable brake shoe chatter.

In some types of brake riggings, the brake shoe heads are connected directly to the brake levers by pins which pass through registering openings formed in the levers and heads. Heretofore it has been the practice to employ a pin having the same diameter throughout its length, except for its head, and this pin has been made to fit in the openings in the lever and brake shoe head in such a manner that there will be relative movement between the head and pin and between the lever and pin, and since this relative movement is permitted, the pin openings in the lever and head will, due to wear, be increased in diameter and the pin decreased in diameter so that there will be considerable play in the connection between the lever and brake shoe head. When this connection is thus worn and the brake shoe is in engagement with the tread of the vehicle wheel, the brake lever will engage one side of the pin and the brake shoe head will engage the opposite side of the pin, and it has been found that since this pin is loose relative to the lever and head, the action of the brake shoe head, when the brake is being applied or released, will cause a hammer-like action to occur between the lever and pin and between the brake shoe head and pin which causes an undesirable noise known as brake shoe chatter and also causes excessive and rapid wear of the pin, head and lever.

Another object of my invention is to provide means whereby the brake lever and brake shoe head of a vehicle brake are operatively connected together so as to eliminate the above objectionable features.

Another object of my invention is to provide a brake lever having integral trunnions or projections for connection with a brake shoe head.

A further object of my invention is to provide a brake shoe head which is adapted to overlap both sides of a brake lever and be operatively mounted, at each side of the lever, upon an outwardly extending trunnion integral with the lever.

A still further object of my invention is to provide a two part brake shoe head adapted to facilitate the application of the brake shoe head to a brake lever having integral brake shoe head trunnions.

Other objects and advantages will appear from the following more detailed description.

In the accompanying drawing: Fig. 1 is a side elevational view of a portion of the brake embodying my invention; Fig. 2 is an end elevational view of the same, the brake shoe and brake shoe key being omitted; Fig. 3 is a vertical sectional view taken on the line 3—3 of Fig. 1, the brake shoe and brake shoe key being omitted; and Fig. 4 is a fragmentary cross sectional view taken on the line 4—4 of Fig. 1.

Referring now in detail to the drawing, the reference character 1 indicates a brake lever of the hanger type which is commonly employed in locomotive brake construction and operatively carried by this lever is a brake shoe head 2 having mounted thereon a brake shoe 3 for frictional engagement with the tread of a wheel 4.

The hanger brake lever 1, adjacent its upper end has an opening 5 formed therein adapted to receive a pivot member which may be mounted in the usual manner on the locomotive frame (not shown). The lever adjacent its lower end has an opening 6 formed therein for the reception of one end of the usual brake beam (not shown).

Intermediate the ends of the lever and extending outwardly from one side thereof is an integral projection or trunnion 7, and extending outwardly from the other side of the lever and in axial alignment with the projection 7 is an integral projection 8.

Since the projections 7 and 8 are integral with the lever, I prefer to make the brake shoe head in two parts, 9 and 10, so as to facilitate the application or removal of the brake shoe head to or from the lever.

The part 9 of the brake shoe head is provided with flanges 11 and 12 which are preferably disposed at right angles to each other and the part 10 is provided with like flanges 13 and 14. The flange 11 has formed therein an opening for the reception of the brake lever trunnion 7 and the flange 13 has formed therein an opening for the reception of the brake lever trunnion 8. The flanges 11 and 13 may directly contact with the trunnions 7 and 8 respectively, but I prefer to interpose a bushing 15 between each flange and the corresponding trunnion.

Engaging the ends of the trunnions 7 and 8 are washers 16 and 17 respectively which are held in such engagement by a bolt 18, having a head 19 at one end engaging the washer 16 and a nut 20 at the other end engaging the washer 17, the nut having screw-threaded connection with the end of the bolt. Between and engaging each of these washers and the adjacent flange of one of the brake shoe head parts is a resilient member, such as a spring 21, which yieldably resists outward movement of the parts 9 and 10 of the brake shoe head.

The brake lever 1 is provided with serrations 22 adapted to cooperate with like serrations 23 provided on the flanges 11 and 13 of the brake shoe head for maintaining the brake shoe head in such a position that the brake shoe will not drag on the tread of the wheel. The pressure of the springs 21 maintains the serrations 22 and 23 in engagement with each other, and when the brake shoe becomes worn, the pressure of the shoe against the tread of the wheel will cause the serrations to ride over each other against the resistance of the springs 21, thus the proper adjustment of the head relative to the brake lever is effected entirely automatically.

The flanges 12 and 14 of the brake shoe head parts 9 and 10 respectively extend inwardly toward each other, there being a slight clearance between the inner edges of the flanges. The flanges 12 and 14 are provided with interengaging lugs 24 and 25, between which there is sufficient clearance to permit the parts 9 and 10 to move outwardly from each other such a distance that the serrations 22 and 23 may ride over each other when the brake shoe head is being adjusted and which will prevent excessive expansion of the parts 9 and 10.

In applying the brake shoe head, the parts 9 and 10 may be mounted on the trunnions 7 and 8 respectively of the lever, after which one of the parts must be rotated on its corresponding trunnion until the lugs 24 and 25 are in their proper overlapping positions.

When the parts 9 and 10 are in their proper positions, a perforated lug 26 on the brake shoe extends through an opening 27 defined by recesses formed in the flanges 12 and 14 and to secure the brake shoe to the head a key 28 is passed through the perforation in the lug 26 of the shoe, the key on each side of the lug engaging the flanges 12 and 14 of the brake shoe head parts 9 and 10. Since the key 27 engages the flanges 12 and 14, the parts 9 and 10 of the head will be prevented from rotating relative to each other on the trunnions of the brake lever.

From the foregoing description it will be seen that since the trunnions 7 and 8 are integral with the brake lever, the hammer action caused in the construction where a loose pin is employed, will not occur.

While I have described my invention in connection with a hanger lever, it will be understood that it may be employed with any type of brake lever having the brake shoe head carried directly thereby.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake lever having trunnions rigid therewith, of a brake shoe head operatively mounted on said trunnions.

2. The combination with a brake lever having trunnions rigid therewith, of a brake shoe head overlapping both sides of said lever and operatively mounted on said trunnions.

3. The combination with a brake lever, of a projection rigid with said lever extending from each side of the lever, and a brake shoe head operatively mounted on the projections.

4. The combination with a brake lever, of a projection rigid with said lever extending from each side of the lever, and a brake shoe head comprising a part mounted on one projection and another part mounted on the other projection.

5. The combination with a brake lever, of axially aligned projections rigid with said lever, a two part brake shoe head mounted on said trunnions, a brake shoe carried by said head, and means for securing said shoe to said head and for securing the parts of said head against rotative movement relative to each other.

6. The combination with a brake lever having a projection extending outwardly from each side of said lever and being rigid therewith, of a brake shoe head comprising two parts, one of said parts being operatively mounted on the projection at one side of said lever and the other of said parts being operatively mounted on the projection at the other side of said lever, and means for locking the parts of said head together.

7. The combination with a brake lever having integral projections extending from the sides of the lever, of a brake shoe head rotatably mounted on said projections.

8. The combination with a brake lever having integral projections extending from the sides of the lever, of a brake shoe head comprising a part rotatably and slidably mounted on one of said projections and a part rotatably and slidably mounted on another of said projections, and means for locking the parts of said head against rotative movement relative to each other.

9. The combination with a brake lever having integral projections extending from the sides of the lever, of a brake shoe head comprising a part rotatably and slidably mounted on one of said projections and a part rotatably and slidably mounted on another of said projections, and means yieldably resisting the sliding movement of the parts of said brake shoe head.

10. The combination with a brake lever having integral projections extending from the sides of the lever, of a brake shoe head comprising a part rotatably and slidably mounted on one of said projections and a part rotatably and slidably mounted on another of said projections, and means on the parts of said head adapted to cooperate to limit the sliding movement of the parts of the head.

11. The combination with a brake lever having integral projections extending from the sides of the lever, of a brake shoe head comprising a part rotatably and slidably mounted on one of said projections and a part rotatably and slidably mounted on another of said projections, means yieldably resisting the sliding movement of the parts of said head, and lugs on said parts adapted to cooperate to limit the sliding movement of said parts.

12. The combination with a brake lever having integral projections extending from the sides of the lever, of a brake shoe head comprising a part rotatably and slidably mounted on one of said projections and a part rotatably and slidably mounted on another of said projections, means yieldably resisting the sliding movement of the parts of said head, lugs on said parts adapted to cooperate to limit the sliding movement of said parts, and means for locking the parts of said head against rotative movement relative to each other.

13. The combination with a brake lever having integral projections extending from the sides thereof, serrations on the sides of said lever, a brake shoe head comprising two parts, each of which is rotatably and slidably mounted on one of said projections and having serrations adapted to cooperate with the serrations on said lever for maintaining said brake shoe head in an adjusted position, and adapted to cooperate to cause the parts of said head to slide on said projections in directions away from each other when the adjustment of said head is being effected, and means adapted to yieldably resist the sliding movement of said parts.

14. The combination with a brake lever having integral projections extending from the sides thereof, serrations on the sides of said lever, a brake shoe head comprising two parts, each of which is rotatably and slidably mounted on one of said projections and having serrations adapted to cooperate with the serrations on said lever for maintaining said brake shoe head in an adjusted position, and adapted to cooperate to cause the parts of said head to slide on said projections in directions away from each other when the adjustment of said head is being effected, and resilient means engaging both of said parts and yieldably resisting the sliding movement of said parts.

In testimony whereof I have hereunto set my hand, this 23rd day of November, 1928.

THOMAS R. McGOWAN.